United States Patent
Zhu et al.

(10) Patent No.: US 7,661,889 B2
(45) Date of Patent: Feb. 16, 2010

(54) OPTICAL MULTIPLEXER AND TRANSMITTER

(75) Inventors: Lijun Zhu, Dublin, CA (US); Jignesh H. Shah, Sunnyvale, CA (US); Hairo Hu, Sunnyvale, CA (US); Yaogeng Ding, Foster City, CA (US); Joseph Vanniasinkam, San Ramon, CA (US)

(73) Assignee: Beam Express Inc, Sunnyvale, CA (US)

( * ) Notice: Subject to any disclaimer, the term of this patent is extended or adjusted under 35 U.S.C. 154(b) by 635 days.

(21) Appl. No.: 11/404,683

(22) Filed: Apr. 14, 2006

(65) Prior Publication Data

US 2007/0242957 A1  Oct. 18, 2007

(51) Int. Cl.
*G02B 6/36* (2006.01)
*H04B 10/06* (2006.01)

(52) U.S. Cl. .............................. 385/93; 385/88; 385/89; 385/92; 385/94; 398/43; 398/45; 398/48; 398/50; 398/79; 398/82; 398/85; 398/88; 398/182; 398/200; 398/201

(58) Field of Classification Search ................... 385/93; 398/85, 200, 201

See application file for complete search history.

(56) References Cited

U.S. PATENT DOCUMENTS

| | | | | | |
|---|---|---|---|---|---|
| 4,671,613 | A | * | 6/1987 | Buhrer | 359/495 |
| 5,005,935 | A | * | 4/1991 | Kunikane et al. | 398/86 |
| 5,574,811 | A | * | 11/1996 | Bricheno et al. | 385/52 |
| 5,661,835 | A | * | 8/1997 | Kato et al. | 385/92 |
| 6,219,470 | B1 | | 4/2001 | Tu | |
| 6,493,121 | B1 | * | 12/2002 | Althaus | 398/135 |
| 6,636,663 | B2 | * | 10/2003 | Lindsey | 385/33 |
| 6,870,976 | B2 | | 3/2005 | Chen et al. | |
| 6,939,058 | B2 | * | 9/2005 | Gurevich et al. | 385/93 |
| 6,954,592 | B2 | * | 10/2005 | Tan et al. | 398/138 |
| 6,962,834 | B2 | | 11/2005 | Stark | |
| 7,184,621 | B1 | * | 2/2007 | Zhu | 385/24 |
| 7,369,776 | B2 | * | 5/2008 | Masahiko | 398/138 |
| 7,450,858 | B2 | * | 11/2008 | Verdiell | 398/164 |
| 2001/0024551 | A1 | | 9/2001 | Yonemura et al. | |
| 2003/0215240 | A1 | * | 11/2003 | Grann et al. | 398/85 |
| 2004/0028353 | A1 | * | 2/2004 | Takagi et al. | 385/93 |
| 2004/0212883 | A1 | * | 10/2004 | Jacobsen | 359/487 |
| 2006/0067690 | A1 | * | 3/2006 | Tatum et al. | 398/66 |
| 2006/0083514 | A1 | * | 4/2006 | Liu et al. | 398/85 |
| 2006/0133742 | A1 | * | 6/2006 | Ruegg et al. | 385/89 |
| 2007/0122154 | A1 | * | 5/2007 | Nakanishi et al. | 398/85 |

OTHER PUBLICATIONS

International Search Report for PCT/US 07/08932 dated Mar. 11, 2008.

* cited by examiner

*Primary Examiner*—Ryan Lepisto
(74) *Attorney, Agent, or Firm*—Turocy & Watson, LLP (57) ABSTRACT

The present invention provides an apparatus for multiplexing a plurality of light waves with different wavelengths. The apparatus includes a laser sub-assembly, a multiplexer sub-assembly, and a receptacle sub-assembly. The laser sub-assembly includes a plurality of lasers for radiating a plurality of light waves of different wavelengths. The plurality of light waves are multiplexed in the multiplexer sub-assembly. The multiplexed light waves are coupled to an optical fiber by the receptacle sub-assembly.

19 Claims, 7 Drawing Sheets

OPTICAL MULTIPLEXER AND TRANSMITTER

BACKGROUND

The present invention relates generally to optical communication devices. More specifically, the present invention relates to an optical multiplexing and transmitting assembly.

An optical multiplexing and transmitting assembly is used for transmitting large amounts of information or data at high speeds through an optical fiber. In multiplexing, two or more signals are combined into a single bit stream by an optical multiplexer. The signals can be individually recovered from the single bit stream, transmitted through an optical fiber, by a demultiplexer.

Currently known optical fibers have core diameters of 50-100 micron for multimode optical fibers, and of less than 10 microns for single-mode optical fibers. These optical fibers are connected to the various optical elements of the optical multiplexing and transmitting assembly. The locations of optical elements need to be fixed in space with sub-micron accuracies and need to be maintained to sub-micron accuracies over time and over temperature excursions. Therefore, there is a need for an optical multiplexing and transmitting assembly that has optical elements fixed at precise locations with sub-micron accuracy, to effectively transmit information or data through optical fibers.

SUMMARY OF THE INVENTION

The invention provides a system for multiplexing a plurality of light waves, and transmitting a multiplexed light wave through a single-mode or multi-mode fiber.

An objective of the invention is to provide an optical transmitter assembly for multiplexing a plurality of light waves of different wavelengths, and transmitting a multiplexed light wave via a single-mode or multi-mode fiber. The optical transmitter assembly includes a laser sub-assembly, a multiplexer sub-assembly, and a receptacle sub-assembly. The laser sub-assembly includes a plurality of lasers for radiating the plurality of light waves of different wavelengths. The multiplexer sub-assembly multiplexes the plurality of light waves into a multiplexed light wave and the receptacle sub-assembly transmits the multiplexed light wave to an optical fiber.

Another objective of the invention is to provide an optical transmitter assembly for multiplexing a plurality of light waves of different wavelengths and transmitting a multiplexed light wave. The optical transmitter assembly includes a laser sub-assembly, a multiplexer sub-assembly, and a receptacle sub-assembly. The laser sub-assembly includes a plurality of lasers for radiating the plurality of light waves of different wavelengths, a plurality of holders for holding the plurality of lasers, and a plurality of spacers. The multiplexer sub-assembly includes a plurality of lenses for collimating the plurality of light waves, a plurality of filters for filtering the collimated light waves, at least one broadband splitter for combining and multiplexing the filtered light waves, and at least one prism for directing the multiplexed light wave into the receptacle sub-assembly. The receptacle sub-assembly includes a focusing lens for focusing the multiplexed light wave, a fiber stub for coupling and transmitting the multiplexed light wave to an optical fiber.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which.

DETAILED DESCRIPTION

Figure 1:
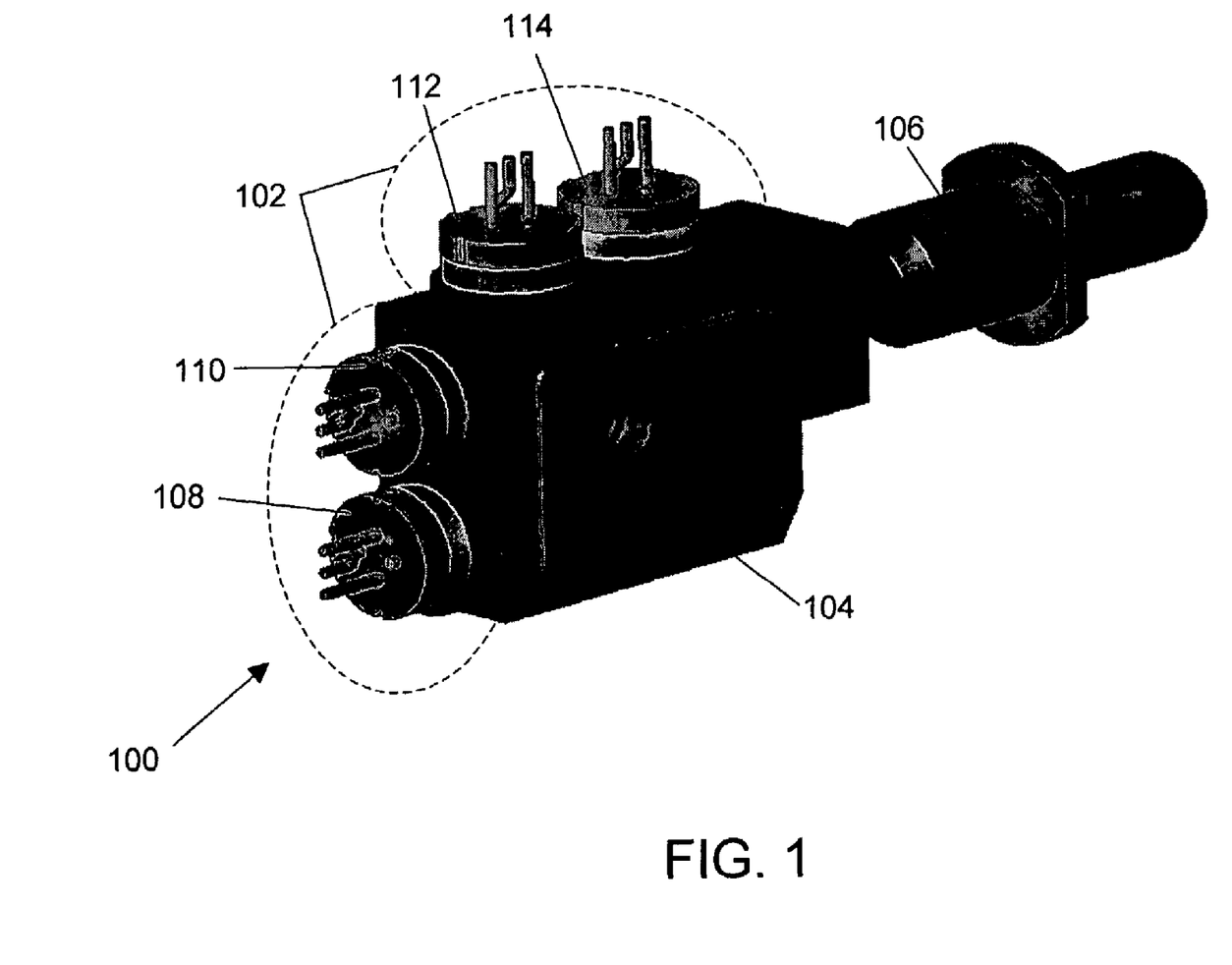
FIG. 1 illustrates an optical transmitter assembly for multiplexing a plurality of light waves and transmitting the multiplexed light waves, in accordance with various embodiments of the invention.

FIG. 1 illustrates an optical transmitter assembly for multiplexing a plurality of light waves and transmitting the multiplexed light waves, in accordance with various embodiments of the invention. Optical transmitter assembly 100 includes a laser sub-assembly 102, a multiplexer sub-assembly 104, and a receptacle sub-assembly 106. Laser sub-assembly 102 includes a plurality of laser modules. Each laser module includes a laser, a holder and a spacer. In an embodiment of the invention, laser sub-assembly 102 includes four laser modules, 108, 110, 112 and 114, which radiate light waves of different wavelengths. These light waves are multiplexed by multiplexer sub-assembly 104 into a multiplexed light wave. The multiplexed light wave is directed into receptacle sub-assembly 106, which couples and transmits the multiplexed light wave to an optical fiber.

Figure 2:
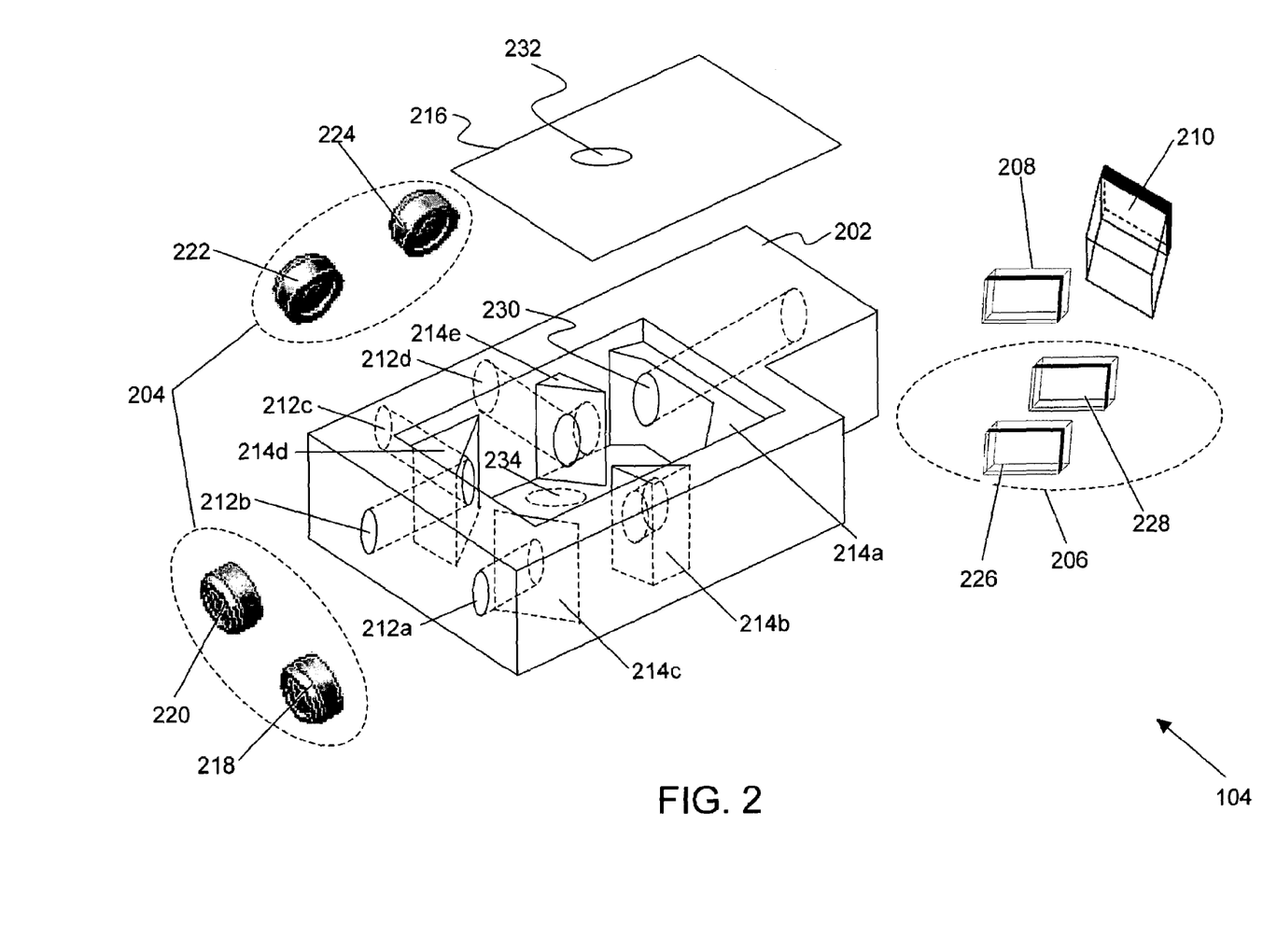
FIG. 2 is an exploded view of a multiplexer sub-assembly, in accordance with various embodiments of the invention.

FIG. 2 is an exploded view of a multiplexer sub-assembly, in accordance with various embodiments of the invention. Multiplexer sub-assembly 104 includes an optical block 202, lenses 204, a set/plurality of filters 206, at least one broadband splitter 208, and at least one prism 210, all mounted (as described below) to compatible metal bases using a solder pre-form. As used herein a "compatible metal" base means one comprised of metal that has thermal expansion characteristics that are similar to that of the optical component which is mounted to it, such bases should also be readily solderable and weldable. One such metal is Kovar™ which is an iron based alloy with nickel and cobalt. The chemistry is closely controlled so as to result in low, uniform, thermal expansion characteristic for the alloy. Of course any other metal having suitable compatible characteristics may also be used Optical block 202 is a machined component. Material for manufacturing optical block 202 may be, for example, stainless steel or any other material that can be laser welded. Optical block 202 includes holes 212, such as holes 212a, 212b, 212c, and 212d, mounting surfaces 214, such as mounting surfaces 214a, 214b, 214c, 214d, and 214e, and a lid 216. Holes 212 mount lenses 204, which collimate light waves coming from laser sub-assembly 102. Optical block 202 further includes a hole 230 for attaching receptacle sub-assembly 106. In an embodiment of the invention, lenses 204 are attached in holes 212 by the application of a suitable adhesive such as epoxy. In another embodiment of the invention, lenses 204 are aspherical glass lenses packaged with metal rings, and the metal rings are laser-welded into holes 212. In an embodiment of the invention, lenses 204 include four lenses, 218, 220, 222 and 224, which collimate light waves radiated by laser modules 108, 110, 112 and 114, respectively. According to various embodiments of the invention, lid 216 includes a hole 230 and is attached to optical block 202 by at least one of seam welding and sealing epoxy.

Figure 3A:
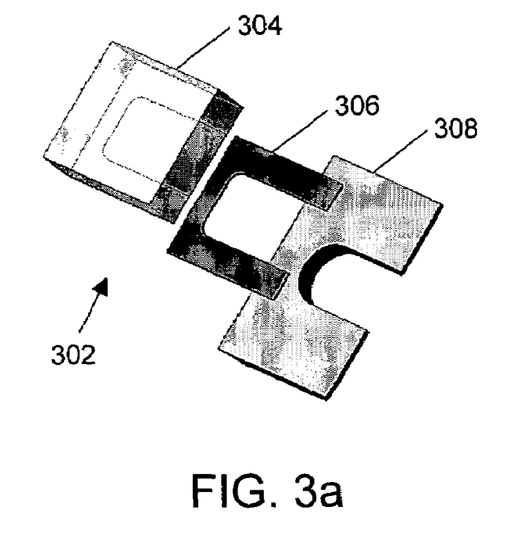
FIG. 3a and FIG. 3b illustrate an exploded and an integrated view of a solder-based assembly of an optical transmitter, in accordance with various embodiments of the invention.
Figure 3B:
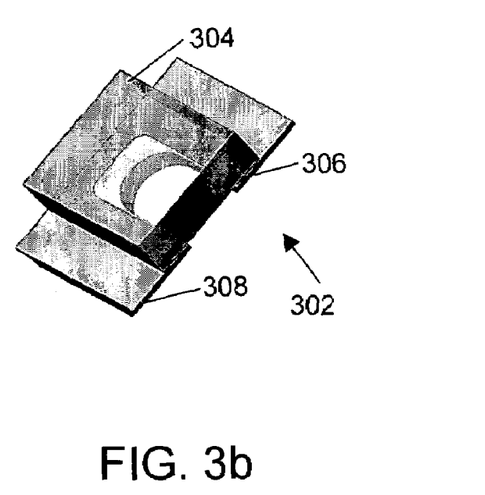

The collimated light waves are filtered by filters 206 mounted on mounting surfaces 214. The mounting arrangement has been illustrated in detail in FIG. 3 of optical block 202. In an embodiment of the invention, filters 206 include a low-pass optical filter 226 and a high-pass optical filter 228. The shaded area of low-pass optical filter 226, high-pass optical filter 228, broadband splitter 208, and prism 210 indicate the compatible metal bases, which are mounted to optical block 202, using the solder pre-form as described below. Low-pass optical filter 226 transmits light waves below a first pre-specified wavelength to pass, and reflects light waves with a wavelength that is higher than the first pre-specified wavelength. According to an embodiment of the invention, low-pass optical filter 226 transmits light waves of wavelength 1275.7+/−7 Nanometer (nm) and reflects light of wavelength 1324+/−7 nm. Similarly, high-pass optical filter 228 allows light waves above a second pre-specified wavelength to pass, and blocks light waves with a wavelength that is lower than the second pre-specified wavelength.

According to an embodiment of the invention, high pass optical filter 228 transmits light of wavelength 1349.2+/−7 nm and reflects light of wavelength 1300.2+/−7 nm. The filtered light waves are multiplexed by broadband splitter 208, which reflects a part of the incident light waves and allows the other part of the incident light waves to pass through. In an embodiment of the invention, broadband splitter 208 is a 50-50 broadband splitter, which reflects 50 percent of incident light waves and allows 50 percent of the incident light waves to pass through. The multiplexed light wave is directed to a desired output location by prism 210. In an embodiment of the invention, prism 210 is a rhombic prism. Prism 210 has two internal surfaces, which direct the multiplexed light wave to a desired output location. The length of the prism is decided, based on the desired location, to output the multiplexed light wave from optical block 202. The desired output location for multiplexed light wave is hole 230. The optical path of the light waves has further been illustrated in conjunction with FIG. 8.

In an embodiment of the invention, grooves are cut in optical block 202 by a wire-cutting process, to define the ideal profile for attaching low-pass optical filter 226, high-pass optical filter 228, broadband splitter 208, and prism 210 on mounting surfaces 214.

FIG. 3a and FIG. 3b illustrate an exploded and an integrated view of a solder-based assembly 302 of an optical transmitter, in accordance with various embodiments of the invention. Solder-based assembly 302 includes metallized filter 304, which is a metallized form of low-pass optical filter 226, high-pass optical filter 228, or broad-band splitter 208; a first pre-form 306, and a first compatible metal base 308. A U-shaped metal pattern is coated around the three sides of low-pass filter 226, high-pass filter 228, or broad-band splitter 208, in order to obtain metallized filter 304. Materials for making U-shaped metal pattern include metals such as Chromium, Nickel, Gold, etc. For example, low-pass optical filter 226, high-pass optical filter 228, and broadband splitter 208 are metallized by means of gold-plating around their circumference.

First pre-form 306 is formed from a eutectic solder, which can be any low-creep solder such as Gold-Tin, Tin-Silver-Copper, etc. As noted above, first compatible metal base 308 is made of a metal, which has thermal expansion coefficient properties similar to that of glass. In accordance with an embodiment of the invention, metallized filter 304 is soldered to first compatible metal base 308 using a reflow oven. In accordance with another embodiment of the invention, the metallized filter 304 is soldered to first compatible metal base 308 using a eutectic die bonder. The aforementioned soldering is performed by taking the three components to a temperature of about 20-30 degrees above the solder pre-form eutectic reflow temperature. According to various embodiments of the invention, solder-based assembly 302 is fastened to mounting surfaces 214 by using laser-welding.

Figure 4A:
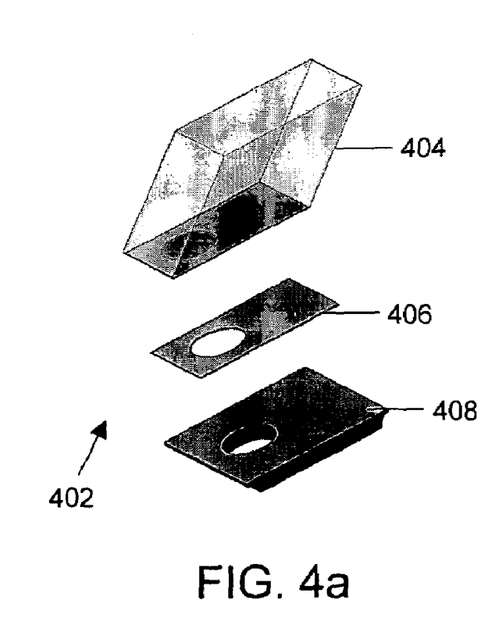
FIG. 4a and FIG. 4b illustrate an exploded and an integrated view of a prism assembly, in accordance with various embodiments of the invention.
Figure 4B:
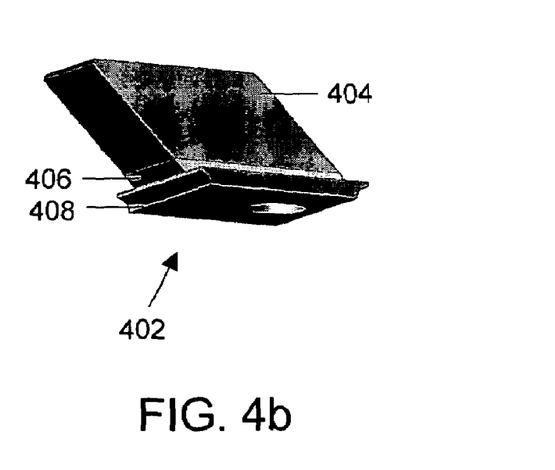

FIG. 4a and FIG. 4b illustrate an exploded and an integrated view of a prism assembly 402, in accordance with various embodiments of the invention. Prism assembly 402 includes a metallized prism 404, a second pre-form 406, and a second compatible metal base 408. Metallized prism is obtained by metallizing one of the surfaces of prism 210, using the same technique as described above for obtaining metallized filter 304. Second pre-form 406 and second compatible metal base 408 are similar in functionalities and physical properties to first pre-form 306, and first compatible metal base 308 respectively. The assembling of metallized prism 404 on second compatible metal base 408 is also done using the same techniques as described above for assembling metallized filter 304 with first kover base 308. According to various embodiments of the invention, prism sub-assembly 402 is fastened to mounting surfaces 214 by using laser-welding.

Figure 5:
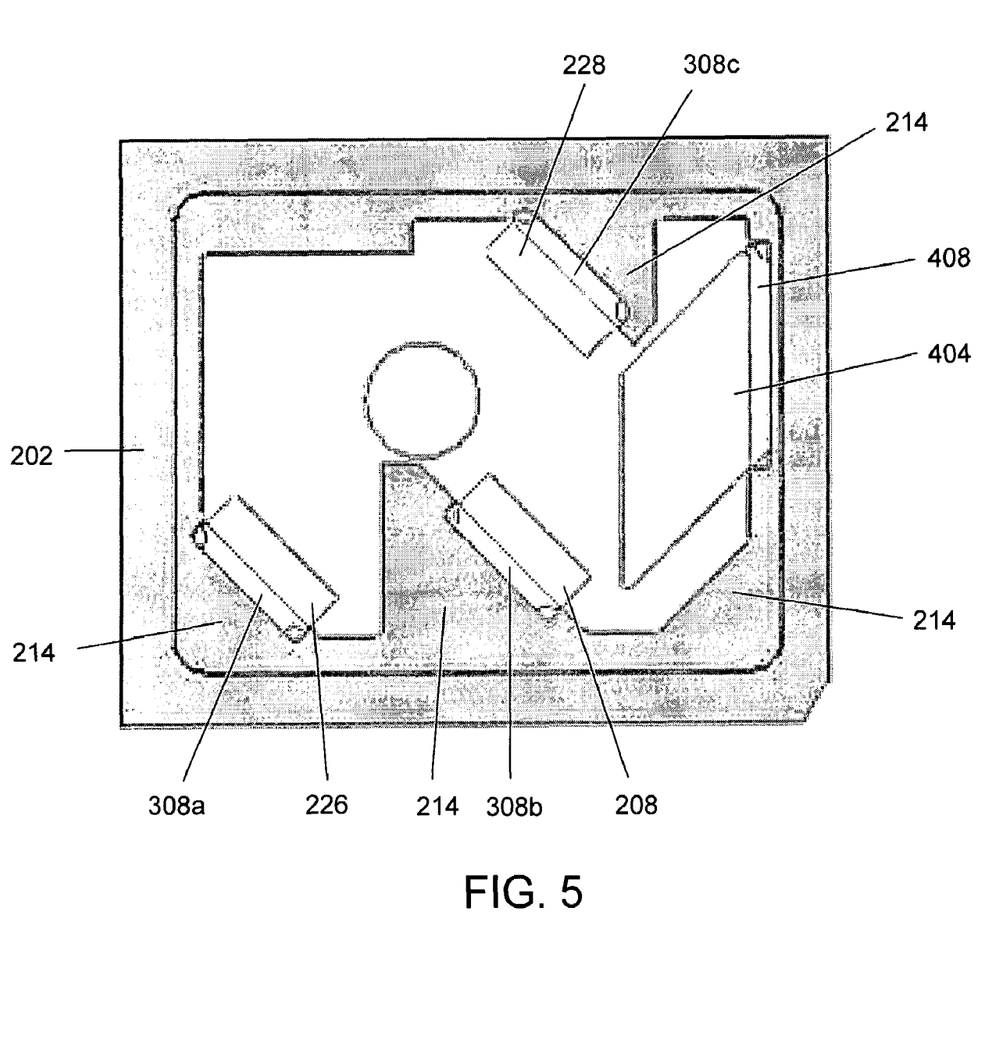
FIG. 5 illustrates the arrangement of low-pass optical filter, high-pass optical filter, broadband splitter, prism, and mounting surfaces, within an optical block in accordance with various embodiments of the invention.

FIG. 5 illustrates the arrangement of low-pass optical filter 226, high-pass optical filter 228, broadband splitter 208, prism 210, and mounting surfaces 214, within optical block 202 in accordance with various embodiments of the invention. According to various embodiments of the invention, solder-based assembly 302 (including metallized filter 304, such as a metallized form of low-pass optical filter 226, broad-band splitter 208, or high-pass optical filter 228, and a compatible metal base 308, such as 308a, 308b, or 308c, respectively) and prism assembly 402 are welded to mounting surfaces 214 by means of laser-welding.

Figure 6:
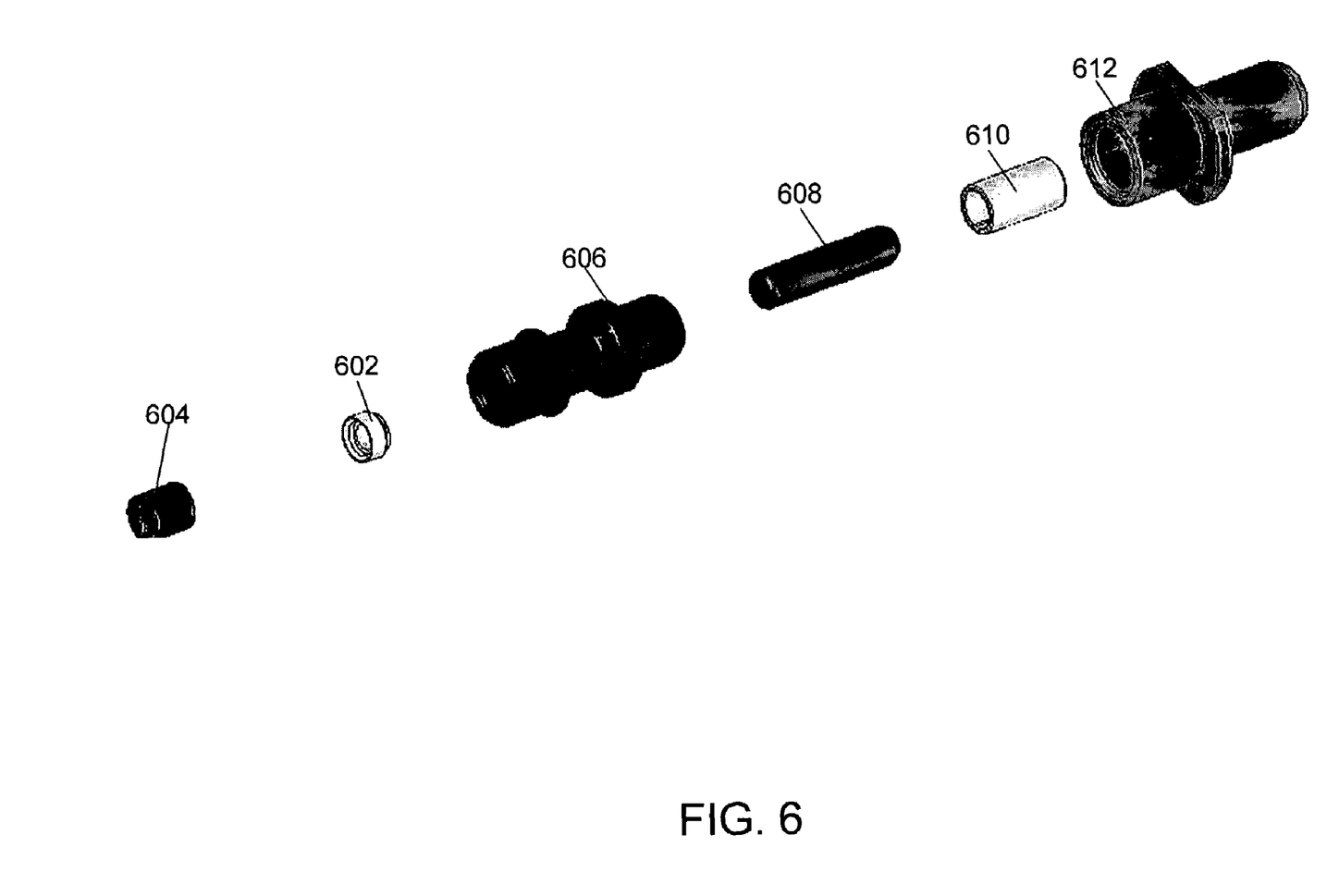
FIG. 6 is an exploded view of a receptacle sub-assembly, in accordance with various embodiments of the invention.

FIG. 6 illustrates an exploded view of receptacle sub-assembly 106, in accordance with various embodiments of the invention. Receptacle sub-assembly 106 includes a focusing lens 602, an optical isolator 604, a lens holder 606, a fiber stub 608, a split sleeve 610, and a receptacle 612. Optical isolator 604 prevents the light reflected from the fiber link from returning back into the lasers, thus reducing back-reflection induced laser noise. Optical isolator 604 is connected to focusing lens 602, which focuses the multiplexed light wave on fiber stub 608. In an embodiment of the invention, the multiplexed light wave is slightly de-focused to optimize the coupling efficiency of the multiplexed light wave. The distance between focusing lens 602 and fiber stub 608 is optimized so that the coupling efficiency of the plurality of light waves, in the multiplexed light wave, is uniform. Fiber stub 608 is attached to lens holder 606, which is a hollow component and holds focusing lens 602 and optical isolator 604. In an embodiment of the invention, focusing lens 602 and optical isolator 604 are passively attached to lens holder 606 by the application of an epoxy. Further, fiber stub 608 is press-fitted into lens holder 606. Fiber stub 608 couples the multiplexed light wave to an optical fiber. The optical fiber and fiber stub 608 are held together by split sleeve 610. The material for fiber stub 608 and split sleeve 610 may be, for example, zirconia or any other ceramic material. Lens holder 606 is then press-fitted into receptacle 612, which has an opening for the optical fiber. In an embodiment of the invention, receptacle sub-assembly 106 is press-fitted at the desired output location in multiplexer sub-assembly 104.

Figure 7:
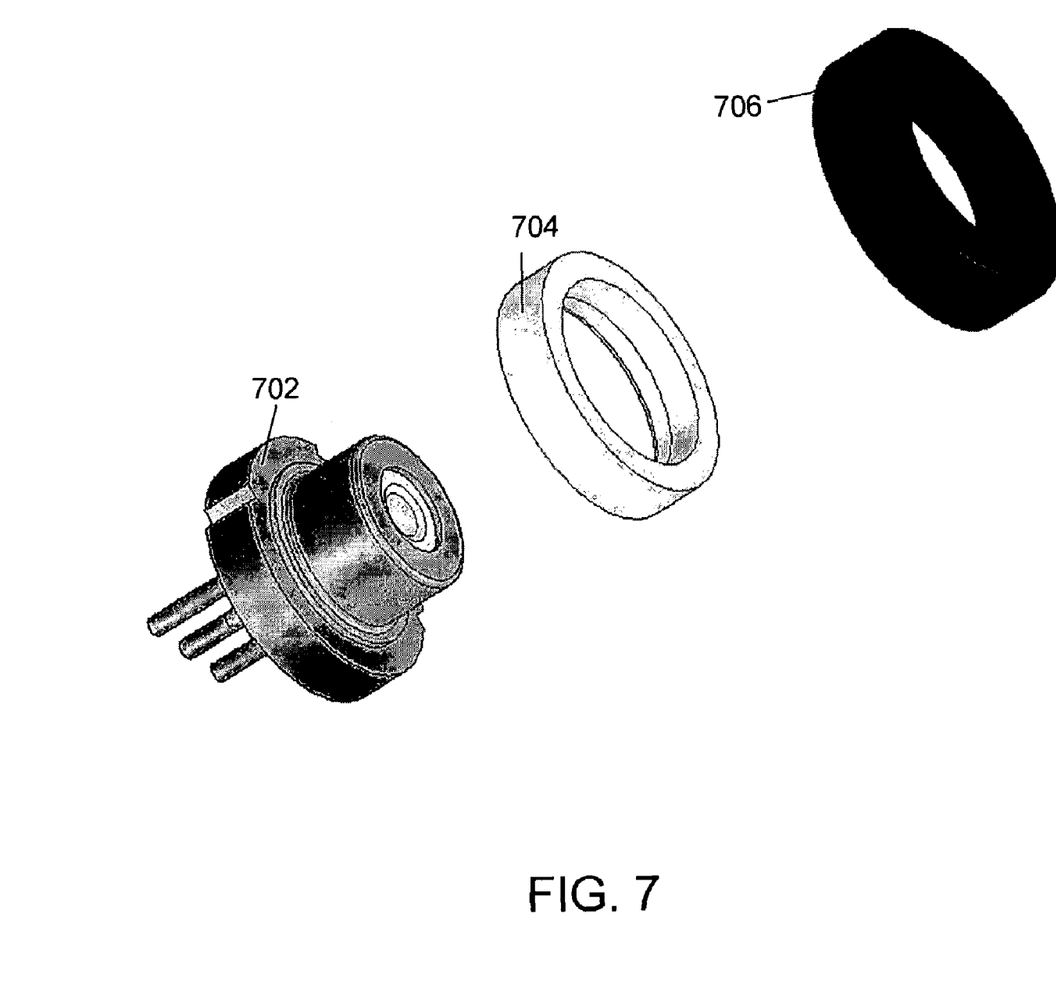
FIG. 7 is an exploded view of a laser module of a laser sub-assembly, in accordance with various embodiments of the invention.

FIG. 7 illustrates an exploded view of laser module 108 of laser sub-assembly 102, in accordance with various embodiments of the invention. Laser module 108 includes a laser 702, a holder 704, and a spacer 706. Laser 702 radiates a light wave of a specific wavelength. In an embodiment of the invention, laser 702 is a distributed feedback laser packaged in a TO56 flat window can. Laser 702 is attached to holder 704 by resistance welding. Holder 704 is attached to spacer 706. Further, spacer 706 is attached to optical block 202 of multiplexer sub-assembly 104. The thickness of spacer 706 is selected to achieve peak alignment between laser module 108 and the assembly of multiplexer sub assembly 104 and receptacle sub-assembly 106.

Figure 8:
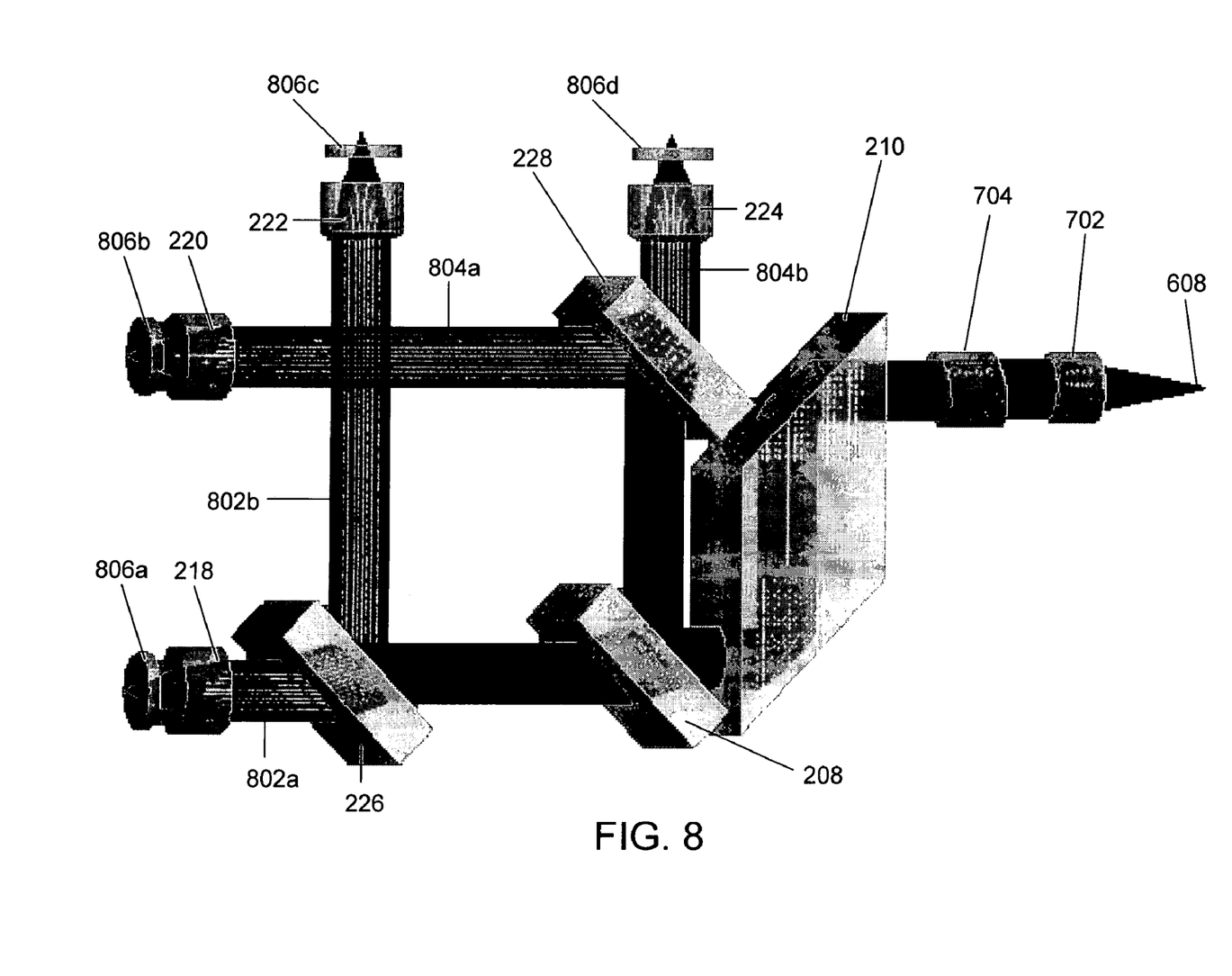
FIG. 8 illustrates the path of optical light waves, in accordance with various embodiments of the invention.

FIG. 8 illustrates a path 802 and a path 804, in accordance with various embodiments of the invention. Path 802a and path 802b are the paths of the optical light waves emerging from laser module 108 and laser module 112 respectively. Similarly, path 804a and path 804b are the paths of the optical light waves emerging from laser module 110 and laser module 114 respectively. In an exemplary embodiment, a first set of optical light waves are emitted from laser module 108 and 112 and pass through spacers 806 in the form of TO56 flat window cans and lenses 218 and 222 respectively. TO56 flat window cans are type of Transistor Outline (TO) packagings used for assembling laser modules. As illustrated in the figure, spacers 806 include a flat window cans 806a, 806b, 806c, and 806d. Subsequently, the first set of optical light waves is transmitted through path 802a and 802b respectively, to low-pass optical filter 226 and broadband splitter 208. Simultaneously, a second set of optical light waves are emitted from laser module 110 and 114 and pass through spacers 806 and lenses 220 and 224 respectively. The second set of optical light waves is then transmitted through path 804a and 804b respectively, to low-pass optical filter 226 and broadband splitter 208. Thereafter, broadband splitter 208 multiplexes the optical light waves and transmits them to prism 210. Prism 210 further transmits the multiplexed optical light waves to optical isolator 604, focusing lens 702 and fiber stub 608.

In an embodiment of the invention, laser module 108 is aligned to multiplexer sub-assembly 104 and receptacle sub-assembly 106 by the active alignment process. The active alignment process includes measuring the intensity of light waves coming out of the receptacle sub-assembly 106 while laser module 108, assembly of multiplexer sub-assembly 104, and receptacle sub-assembly 106 are being aligned. Laser module 108 is actively aligned along three axes (two lateral directions and an axial direction) with sub-micron resolution. Spacer 806 is laser-welded to optical block 202 at a correct axial distance (an optimal distance between laser 802 and lens 218 at which peak alignment, a desired value of intensity of light waves, is observed). Further, laser 802, welded to holder 804, is actively aligned along two axes (two lateral directions) and laser-welded to spacer 806 at a position where peak alignment is observed.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. An optical transmitter assembly for optical communication, the optical transmitter assembly comprising:
    a. a laser sub-assembly, the laser sub-assembly comprising a plurality of lasers radiating light waves, wherein each light wave is of a different wavelength;
    b. a multiplexer sub-assembly, the multiplexer sub-assembly being attached to the laser sub-assembly, the multiplexer sub-assembly multiplexing the light waves radiated by the plurality of lasers, wherein the light waves are multiplexed into a multiplexed light wave, the multiplexer sub-assembly comprising:
        i. a plurality of lenses, the plurality of lenses collimating light waves coming from the plurality of lasers;
        ii. a plurality of filters, the plurality of filters filtering the collimated light waves;
        iii. at least one broadband splitter, the at least one broadband splitter combining the filtered light waves; and
        iv. at least one prism, the at least one prism directing the combined light waves; and
    c. a receptacle sub-assembly, the receptacle sub-assembly being attached to the multiplexer sub-assembly, the receptacle sub-assembly transmitting the multiplexed light wave coming from the multiplexer sub-assembly.

2. The optical transmitter assembly according to claim 1, wherein the laser sub-assembly is attached to the multiplexer sub-assembly by an active alignment process, followed by laser welding of the laser sub-assembly to the multiplexer sub-assembly.

3. The optical transmitter assembly according to claim 1, wherein the laser sub-assembly further comprises:
    a. a plurality of holders, the plurality of holders holding the plurality of lasers; and
    b. a plurality of spacers, the plurality of spacers being attached to the plurality of holders for holding the plurality of lasers.

4. The optical transmitter assembly according to claim 3, wherein the plurality of holders are attached to the plurality of lasers by welding.

5. The optical transmitter assembly according to claim 1, wherein the multiplexer sub-assembly further comprises a plurality of holes, the plurality of holes for holding the plurality of lenses and the receptacle sub-assembly.

6. The optical transmitter assembly according to claim 1, wherein the multiplexer sub-assembly further comprises an optical block, the optical block comprising:
    a. a plurality of holes, the plurality of holes for holding the plurality of lenses and the receptacle sub-assembly;
    b. a plurality of mounting surfaces, the plurality of mounting surfaces for mounting the plurality of filters, the at least one broadband splitter, and the at least one prism; and
    c. a lid, the lid covering the optical block.

7. The optical transmitter assembly according to claim 6, wherein the plurality of lenses is attached to the optical block by at least one of epoxy and laser welding.

8. The optical transmitter assembly according to claim 6, wherein the plurality of filters, the at least one broadband splitter, and the at least one prism are attached to the optical block through at least one of a compatible metal base material and a metallic base material.

9. The optical transmitter assembly according to claim 8, wherein one of the compatible metal base material and the metallic base material is attached to the plurality of filters, the at least one broadband splitter and the at least one prism, are attached through a eutectic solder pre-form that has undergone solder reflow.

10. The optical transmitter assembly according to claim 8, wherein one of the compatible metal base material or the metallic base material is attached to the optical block by means of welding.

11. The optical transmitter assembly according to claim 6, wherein the lid is attached to the optical block by at least one of seam welding and sealing epoxy.

12. The optical transmitter assembly according to claim 1, wherein the plurality of filters comprise:
 a. at least one low-pass filter, the at least one low-pass filter filtering one or more of the collimated light waves; and
 b. at least one high-pass filter, the at least one high-pass filter filtering one or more of the collimated light waves.

13. The optical transmitter assembly according to claim 1, wherein the receptacle sub-assembly comprises:
 a. a focusing lens, the focusing lens focusing the multiplexed light wave; and
 b. a fiber stub, the fiber stub coupling the multiplexed light wave coming from the focusing lens to an optical fiber.

14. The optical transmitter assembly according to claim 13, wherein the receptacle sub-assembly further comprises:
 a. an isolator, the isolator being connected to the focusing lens, the isolator reducing a laser-noise that is induced by back-reflection;
 b. a split sleeve, the split sleeve connecting the fiber stub and the optical fiber;
 c. a lens holder, the lens holder holding the focusing lens, the isolator, the fiber stub, and the optical fiber; and
 d. a receptacle, the receptacle housing the lens holder.

15. The optical transmitter assembly according to claim 14, wherein the focusing lens is attached to the lens holder by at least one of an adhesive and welding.

16. The optical transmitter assembly according to claim 14, wherein the isolator is attached to the lens holder by an adhesive.

17. A method of assembling the optical transmitter assembly for optical communication of claim 1, the method comprising:
 a. metallizing a surface of an optical component over a U-shaped peripheral area, wherein the optical component is included in the optical transmitter assembly;
 b. soldering an upper side of a eutectic solder pre-form to both the metallized peripheral area, the eutectic solder pre-form having the shape of the peripheral area;
 c. soldering a lower side of the eutectic solder pre-form to a compatible metal base; and
 d. welding the compatible metal base to a mounting surface, the mounting surface being inside the optical transmitter assembly.

18. An optical transmitter assembly for optical communication, the optical transmitter assembly comprising:
 a. a laser sub-assembly, the laser sub-assembly comprising:
  i. a plurality of lasers, the plurality of lasers radiating light waves, wherein each light wave is of a different wavelength;
  ii. a plurality of holders, the plurality of holders holding the plurality of lasers; and
  iii. a plurality of spacers, the plurality of spacers being attached to the plurality of holders;
 b. a multiplexer sub-assembly, the multiplexer sub-assembly being attached to the laser sub-assembly, the multiplexer sub-assembly multiplexing light waves radiated by the plurality of lasers, into a multiplexed light wave, the multiplexer sub-assembly comprising:
  i. a plurality of lenses, the plurality of lenses collimating light waves coming from the plurality of lasers;
  ii. a plurality of filters, the plurality of filters filtering the collimated light waves;
  iii. at least one broadband splitter, the at least one broadband splitter combining the filtered light waves; and
  iv. at least one prism, the at least one prism directing the combined light waves; and
  v. an optical block, the optical block holding the plurality of lenses, the plurality of filters, the at least one broadband splitter, and the at least one prism;
 c. a receptacle sub-assembly, the receptacle sub-assembly being attached to the multiplexer sub-assembly, the receptacle sub assembly transmitting the multiplexed light wave, the receptacle sub-assembly comprising:
  i. an isolator
  ii. a focusing lens, the focusing lens focusing the multiplexed light wave coming through the isolator;
  iii. a fiber stub, the fiber stub coupling the multiplexed light wave coming from the focusing lens to an optical fiber;
  iv. a split sleeve, the split sleeve for connecting the fiber stub and the optical fiber together;
  v. a lens holder, the lens holder holding the focusing lens, the isolator, the fiber stub and the optical fiber; and
  vi. a receptacle, the receptacle housing the lens holder.

19. A method of assembling the optical transmitter assembly for optical communication of claim 18, the method comprising:
 a. metallizing a surface of an optical component over a U-shaped peripheral area, wherein the optical component is included in the optical transmitter assembly;
 b. soldering an upper side of a eutectic solder pre-form to both the metallized peripheral area, the eutectic solder pre-form having the shape of the peripheral area;
 c. soldering a lower side of the eutectic solder pre-form to a compatible metal base; and
 d. welding the compatible metal base to a mounting surface, the mounting surface being inside the optical transmitter assembly.

* * * * *

UNITED STATES PATENT AND TRADEMARK OFFICE
CERTIFICATE OF CORRECTION

| | | |
|---|---|---|
| PATENT NO. | : 7,661,889 B2 | Page 1 of 1 |
| APPLICATION NO. | : 11/404683 | |
| DATED | : February 16, 2010 | |
| INVENTOR(S) | : Zhu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 943 days.

Signed and Sealed this

Thirtieth Day of November, 2010

David J. Kappos
*Director of the United States Patent and Trademark Office*